(12) United States Patent
Shapiro et al.

(10) Patent No.: US 7,498,644 B2
(45) Date of Patent: Mar. 3, 2009

(54) PREVENTION OF TAMPERING IN ELECTRONIC DEVICES

(75) Inventors: Yigal Shapiro, Kiryat Motzkin (IL); Reuven Elbaum, Haifa (IL)

(73) Assignee: NDS Limited, Middlesex (GB)

( * ) Notice: Subject to any disclaimer, the term of this patent is extended or adjusted under 35 U.S.C. 154(b) by 592 days.

(21) Appl. No.: 10/516,487

(22) PCT Filed: Jun. 1, 2003

(86) PCT No.: PCT/IL03/00456

§ 371 (c)(1),
(2), (4) Date: Jun. 24, 2005

(87) PCT Pub. No.: WO03/102510

PCT Pub. Date: Dec. 11, 2003

(65) Prior Publication Data

US 2005/0236683 A1    Oct. 27, 2005

Related U.S. Application Data (60) Provisional application No. 60/385,963, filed on Jun. 4, 2002, provisional application No. 60/438,360, filed on Jan. 7, 2003, provisional application No. 60/460,227, filed on Apr. 2, 2003.

(51) Int. Cl.
*H01L 23/02* (2006.01)
(52) U.S. Cl. .................................. 257/428; 257/678
(58) Field of Classification Search ................ 257/678, 257/778, 782; 380/3
See application file for complete search history.

(56) References Cited

U.S. PATENT DOCUMENTS

| | | | |
|---|---|---|---|
| 5,053,992 A | 10/1991 | Gilberg et al. | |
| 5,117,457 A * | 5/1992 | Comerford et al. | 713/194 |
| 5,389,738 A | 2/1995 | Poisenka et al. | |
| 5,533,123 A | 7/1996 | Force et al. | |
| 5,998,858 A | 12/1999 | Little et al. | |
| 6,060,773 A | 5/2000 | Ban et al. | |
| 6,291,839 B1 | 9/2001 | Lester | |
| 6,545,371 B1 * | 4/2003 | Matsumoto et al. | 257/660 |
| 6,926,204 B2 * | 8/2005 | Vacherand et al. | 235/492 |
| 7,039,815 B1 | 5/2006 | Grassl et al. | |

(Continued)

FOREIGN PATENT DOCUMENTS

EP             1 128 248        8/2001

(Continued)

OTHER PUBLICATIONS

Nov. 19, 2007 Office Action in respect to Application No. EP 03 756 094.3.

(Continued)

*Primary Examiner*—Roy K Potter
(74) *Attorney, Agent, or Firm*—Ladas & Parry LLP (57) ABSTRACT

Circuitry for protection of an integrated circuit (20) which includes operational-circuits (24) formed on a chip (21). The circuitry includes a plurality of detectors (26), integrally formed on the chip as part of the integrated circuit and dispersed among the operational-circuits on the chip. The detectors are adapted, in response to radiation incident on the chip, to trigger a security measure so as to prevent tampering with the integrated circuit.

41 Claims, 4 Drawing Sheets

U.S. PATENT DOCUMENTS

| | | | |
|---|---|---|---|
| 7,281,667 B2* | 10/2007 | Farooq et al. ............... | 235/492 |
| 2002/0130248 A1 | 9/2002 | Bretschneider et al. | |
| 2006/0081912 A1 | 4/2006 | Wagner et al. | |

FOREIGN PATENT DOCUMENTS

| | | |
|---|---|---|
| EP | 1 178 529 | 2/2002 |
| WO | 99/35554 | 7/1999 |
| WO | 01/43191 | 6/2001 |
| WO | 01/50530 | 7/2001 |

OTHER PUBLICATIONS

Supplementary European Search Report.

English Translation of Abstract of EP 1 128 248 dated Aug. 29, 2001 and English Computer-Generated Translation of the description of EP 1 128 248.

"Understanding and Specifying Comprehensive Security For High-Value / High—Risk Smart Card—Based Systems" *Schlumberger*, Copyright 1999, p. 3-p. 14.

Kommerling, O., et al. "Design Principles for Tamper-Resistant Smartcard Processors" *USENIX Workshop on Smartcard Technology*, (1999).

Samyde, D., et al. "On a New Way to Read Data from Memory" *Computer Laboratory and Universite catholique de Louvain*.

Skorobogatov, S., et al. "Optical Fault Induction Attacks" *University of Cambridge, Computer Laboratory*.

Govindavajhala, S., et al. "Using Memory Errors to Attack a Virtual Machine" *IEEE Symposium on Security and Privacy* (2003) p. 1-p. 12.

\* cited by examiner

PREVENTION OF TAMPERING IN ELECTRONIC DEVICES

CROSS REFERENCE TO RELATED APPLICATIONS

The present application is a 35 U.S.C. §371 application of PCT/IL03/00456, which was published on 11 Dec. 2003 in the English language with International Publication Number WO 03/102510.

This application claims the benefit of U.S. provisional patent applications 60/385,963 filed 4 Jun. 2002, and 60/438,360 filed 7 Jan. 2003, and U.S. provisional application titled 60/460,227 "Light Detecting Memory Cell," filed 2 Apr. 2003, which are incorporated herein by reference.

FIELD OF THE INVENTION

The present invention relates generally to electronic devices, and specifically to prevention and/or detection of tampering in the devices.

BACKGROUND OF THE INVENTION

Integrated circuits, for example those incorporated in "Smart Cards," may contain sensitive information which needs to be kept secret, and/or circuitry which must be guarded from tampering. By their very nature, however, the integrated circuits, also known as chips, may be relatively easily accessible to tampering by an unauthorized person, and the prevention and/or detection of such tampering is consequently an important consideration in designing the chips. There are a number of forms of tampering which are known, including de-capsulation, reverse engineering, the introduction of glitches into a part of the chip, active optical attacks, etc.

Active optical attacks comprise illuminating an integrated circuit (IC), or a part of the IC, so as to compromise the security of the circuit. The illumination typically prevents a section of the IC working correctly, and/or makes the IC operate differently, and/or changes content of a memory cell, and thus inserts a fault into the IC. *Optical Fault Induction Attacks*, by Skorobogatov et al., Cryptographic Hardware and Embedded Systems 2002, Springer Lecture, Notes in Computer Science, (May 2002) describes one method of optical attack, and some of the results that may be produced. The attack may be able to decipher data encoded into the IC, set data to a different value, and/or introduce errors into operation of the IC. The article describes a defensive technology using self-time dual-rail logic, where a state of the dual-rail logic that is normally an unwanted state is used as an error signal to lock the device.

International Patent Application WO 01/50530, to Kommerling et al., describes an IC which has an encryption/decryption circuit which protects a memory and/or a central processing unit (CPU) from tampering. The IC includes a protective member, typically the IC encapsulation or packaging, which has a physical parameter that is detected if tampering with the IC is attempted. The physical parameter may be derived from areas of the protective member dispersed across or around the IC. Detecting a change in the parameter causes the encryption/decryption circuit to function differently.

European Patent Application EP1128248, to Dietl, describes a semiconductor chip comprising a monolithically integrated circuit, at least one light-sensitive element, and a switching means which triggers a reset command for the circuit. The reset command is triggered depending on the state of the at least one light-sensitive element. A flip-flop is provided as the switching means.

U.S. Pat. No. 5,998,858 to Little et al., whose disclosure is incorporated herein by reference, describes a combination of hardware and software mechanisms that prevent unauthorized access to the data stored in a memory of an IC with a sealed enclosure. The IC may have various wrongful entry detection circuits that destroy live SRAM data upon tampering with the sealed enclosure. The detection circuits can include light sensing circuitry.

U.S. Pat. No. 5,533,123 to Force et al., whose disclosure is incorporated herein by reference, describes a chip which is secured against intrusion by three interrelated systems: (i) detectors, which alert the chip to the existence of a security attack; (ii) filters, which correlate the data from the various detectors, weighing the severity of the attack against the risk to the chip's integrity; and (iii) responses, which are countermeasures, calculated by the filters to be most appropriate under the circumstances, to deal with the attack or attacks present. The detectors may include light detectors.

U.S. Pat. No. 5,053,992 to Gilberg et al., whose disclosure is incorporated herein by reference, describes a chip having a memory that stores secret data, and an opaque layer of material encapsulating the chip. Removal of the encapsulation is detected by a light sensitive element, and this in turn causes the secret data to be eliminated from the memory element.

While the above systems provide some measure of security for an integrated circuit against optical attack, they may be circumvented by an optical attack that is focused on a relatively small portion of the chip.

The disclosures of all references mentioned above and throughout the present specification are hereby incorporated herein by reference.

SUMMARY OF THE INVENTION

It is an object of some aspects of the present invention to provide a method and apparatus for preventing tampering with an integrated circuit.

In preferred embodiments of the present invention, an integrated circuit (IC) includes operational-circuits formed on a sermiconductor chip. Detectors are integrally formed on the chip as part of the IC and are dispersed among the operational-circuits. The detectors act as radiation detectors which, in response to radiation incident on the chip, trigger a security measure so as to prevent tampering with the IC. Typically, the security measure terminates or otherwise interrupts the normal operation of the operational-circuits. The dispersal of the detectors among the operational-circuits provides an efficient and cost-effective method for detecting and/or neutralizing an "attack" on the IC.

In some preferred embodiments of the present invention, the operational-circuits and the detectors are implemented using the same technology. The operational-circuits include components having predefined circuit attributes. The detectors are preferably formed by modifying at least one of the circuit attributes such as the dimensions of one or more of the components, so as to alter the response of the detectors to the radiation relative to the response of an unmodified circuit. The detectors thus typically comprise small circuits which respond to a lower level of radiation than does an operational-circuit. In the event of radiation irradiating an area that contains one or more detectors, at a level that may cause the operational-circuits to malfunction, or at a lower level, the irradiated detectors generate a signal which provides an indication that the IC is being attacked. The signal may be conveyed to a control circuit which may take security measures (or any other predetermined action) so as to circumvent the attack, for example, by generating a hardware-reset signal.

In some preferred embodiments of the present invention, the detectors are formed by modifying circuit attributes such as the dimensions of a component in the operational-circuits, so that the detectors serve as components in the operational-circuit. As long as no radiation is incident on the operational-circuit, the operational-circuit (including the detector) functions according to predefined specifications. Irradiation of the detector causes the operational-circuit to function differently from the predefined specifications, the different functioning serving as the security measure.

The operational-circuits typically comprise transistors, such as are formed in CMOS technology (complementary metal oxide semiconductor field effect transistors), and the detectors are preferably implemented by making one or more relatively minor modifications to these transistors. The modifications change the sensitivity of a circuit comprising the modified transistors to radiation, compared to the sensitivity of an unmodified circuit. In some preferred embodiments of the present invention, each detector is formed from a pair of transistors connected in series, herein termed a "detector-pair." One or both transistors of the detector-pair may be a modified transistor, so that the detector-pair has an asymmetric response to light, compared to a pair of unmodified transistors in series.

Detector-pairs are preferably implemented as one of two asymmetric types. The output of a first asymmetric type, when it is irradiated, corresponds to a digital "0," regardless of the input to the detector-pair. The output of a second asymmetric type, when it is irradiated, corresponds to a digital "1," regardless of its input.

In some preferred embodiments of the present invention, a third type of circuit (apart from the operational-circuits and the detectors) having an asymmetric response to light is used to prevent neutralization of the signal from the detectors. The third type of circuit is herein termed an asymmetric-circuit. For example: an asymmetric inverting buffer comprises a pair of transistors connected in series, one or both of the transistors being modified to create the asymmetric response. An asymmetric-circuit may also be configured to act as a radiation detector.

Preferably, the detectors are dispersed at regions of the IC that are known to be particularly sensitive to tampering, such as registers of the IC. Signal lines from some (or all) of the dispersed detectors may be fed through one or more asymmetric-buffers to one or more signal receivers, which generate the indication of the attack if they receive a signal from any of the detectors. The one or more signal receivers may also comprise one or more asymmetric-circuits.

The detectors may be formed so as to sense any type of radiation that changes the functionality of the operational-circuits. Such radiation includes, but is not limited to, optical radiation, X-rays, and ionizing radiation such as alpha particle radiation.

In some preferred embodiments of the present invention, the radiation detector comprises a memory. The memory is most preferably formed from at least one detector-pair, so that it is sensitive to radiation, and so that the contents of the memory are forced to a known state upon irradiation. The memory thus acts both as a memory and as a detector.

There is therefore provided, according to a preferred embodiment of the present invention, circuitry for protection of an integrated circuit which includes operational-circuits formed on a chip, the circuitry including:

a plurality of detectors, integrally formed on the chip as part of the integrated circuit and dispersed among the operational-circuits on the chip, the detectors being adapted, in response to radiation incident on the chip, to trigger a security measure so as to prevent tampering with the integrated circuit.

Preferably, the operational-circuits include components having predetermined circuit dimensions, and the detectors are formed by modifying the circuit dimensions of one or more of the components so as to alter the response of the detectors to the radiation relative to the response of the operational-circuits that include the components having the predetermined circuit dimensions.

Alternatively or additionally, the operational-circuits include components having predetermined doping, and the detectors are formed by modifying the doping of one or more of the components so as to alter the response of the detectors to the radiation relative to the response of the operational-circuits that include the components having the predetermined doping.

Preferably, at least one of the detectors includes a p-channel transistor coupled in series with an n-channel transistor, and in response to the radiation a conductance of the p-channel transistor is substantially different from the conductance of the n-channel transistor. Further preferably, at least one of the detectors includes a memory, and the security measure includes a change of state of the memory.

The integrated circuit is preferably implemented according to a technology chosen from at least one of metal oxide semiconductor and bipolar technologies, and the chip is a semiconductor chip.

The radiation preferably includes at least one type of radiation chosen from electromagnetic radiation and ionizing radiation.

Preferably, the plurality of detectors are chosen from at least one biased-low detector which is operative to generate a logic low level in response to the radiation and at least one biased-high detector which is operative to generate a logic high level in response to the radiation.

Further preferably, the circuitry includes a roughened chip surface that defocuses the radiation, and alternatively or additionally, the tampering includes a fault being inserted into one of the operational-circuits so as to cause a functional result in the integrated circuit.

Preferably, the operational-circuits include components having predefined attributes, and the detectors are formed by modifying at least one of the attributes of one or more of the components so as to alter the response of the detectors to the radiation relative to the response of the components having the predefined attributes. Further preferably, at least one of the detectors is coupled to serve as one of the components in one of the operational-circuits.

Preferably, the one of the operational-circuits functions according to predefined specifications while the radiation is not incident thereon, and functions differently from the predefined specifications while the radiation is incident thereon.

Further preferably, the components include transistors, and the response of the detectors includes an altered conductance of the transistors.

Preferably, the response of the detectors includes a change in an operational level of the operational-circuits, and alternatively or additionally, the response of the detectors includes a change in a signal timing of the operational-circuits.

The predefined attributes are preferably chosen from at least one of layout attributes, layout dimensions, manufacturing-process attributes, doping dosage, adding a sub-element of the component, removing the sub-element of the component, and materials type.

Preferably, the radiation includes detector-triggering radiation, and a level of the detector-triggering radiation is less than the level of radiation that affects a functionality of the operational-circuits while being sufficient to trigger the detectors. Further preferably, the radiation includes optical radiation.

The circuitry preferably includes an auxiliary circuit which is coupled to at least one of the plurality of detectors and which is implemented to receive a trigger signal from the at least one of the detectors. Further preferably, the trigger signal is received as the security measure and the auxiliary circuit is implemented to generate a control signal in response thereto, and the circuitry includes a control circuit which is coupled to receive the control signal so as to initiate an alarm in response thereto.

Preferably, the auxiliary circuit includes elements selected from the operational-circuits and the detectors so as to provide an indication of the radiation in response to the radiation being incident on at least a part of the auxiliary circuit.

Further preferably, the auxiliary circuit includes a memory, and the indication includes a change of state of the memory.

Preferably, the auxiliary circuit has an asymmetric response to the radiation, and is implemented to convey an indication of the radiation to a signal receiver regardless of the radiation on the auxiliary circuit.

The circuitry preferably includes one or more auxiliary circuits coupled to at least one of the detectors and having an asymmetric response to the radiation.

Preferably, the one or more auxiliary circuits include a biased-low auxiliary circuit configured to output a logic low level in response to the radiation and a biased-high auxiliary circuit configured to output a logic high level in response to the radiation, and wherein the biased-low auxiliary circuit and the biased-high auxiliary circuit are connected in series.

Further preferably, the plurality of detectors includes a memory consisting of at least one of a biased-low detector which is operative to generate a logic low level-in response to the radiation and a biased-high detector which is operative to generate a logic high level in response to the radiation. Preferably, the biased-low detector and the biased-high detector are coupled in series.

There is further provided, according to a preferred embodiment of the present invention, a method for protection of an integrated circuit, which includes operational-circuits formed on a chip, the method including:

integrally forming a plurality of detectors on the chip as part of the integrated circuit, so that the detectors are dispersed among the operational-circuits on the chip, the detectors being adapted, in response to radiation incident on the chip, to trigger a security measure so as to prevent tampering with the integrated circuit. Preferably, the operational-circuits include components having predetermined circuit dimensions, and the detectors are formed by modifying the circuit dimensions of one or more of the components so as to alter a response of the detectors to the radiation relative to a response of the operational-circuits that include the components having the predetermined circuit dimensions. Alternatively or additionally, the operational-circuits include components having predetermined doping, and the detectors are formed by modifying the doping of one or more of the components so as to alter a response of the detectors to the radiation relative to a response of the operational-circuits that include the components having the predetermined doping.

Preferably, at least one of the detectors includes a p-channel transistor coupled in series with an n-channel transistor, and in response to the radiation a conductance of the p-channel transistor is substantially different from the conductance of the n-channel transistor. Further preferably, at least one of the detectors includes a memory, and the security measure includes a change of state of the memory.

The integrated circuit is preferably implemented according to a technology chosen from at least one of metal oxide semiconductor and bipolar technologies, and the chip is preferably a semiconductor chip.

The radiation preferably includes at least one type of radiation chosen from electromagnetic radiation and ionizing radiation.

The method preferably includes choosing the plurality of detectors from at least one biased-low detector which is operative to generate a logic low level in response to the radiation and at least one biased-high detector which is operative to generate a logic high level in response to the radiation.

The method preferably includes roughening a chip surface so as to defocus the radiation, and further preferably includes coupling an auxiliary circuit to at least one of the plurality of detectors the auxiliary circuit being implemented to receive a trigger signal from the at least one of the detectors.

Preferably, tampering includes inserting a fault into one of the operational-circuits so as to cause a functional result in the integrated circuit.

Preferably, the radiation includes detector-triggering radiation, and a level of the detector-triggering radiation is less than the level of radiation that affects a functionality of the operational-circuits while being sufficient to trigger the detectors. Further preferably, wherein the radiation includes optical radiation.

The method preferably includes providing an auxiliary circuit which is coupled to at least one of the plurality of detectors and which is implemented to receive a trigger signal from the at least one of the detectors.

Preferably, the trigger signal is received as the security measure and the auxiliary circuit is implemented to generate a control signal in response thereto, and the method includes coupling a control circuit to receive the control signal so as to initiate an alarm in response thereto.

Preferably, the auxiliary circuit includes elements selected from the operational-circuits and the detectors so as to provide an indication of the radiation in response to the radiation being incident on at least a part of the auxiliary circuit. Further preferably, the auxiliary circuit includes a memory, and the indication consists of a change of state of the memory.

Preferably, the auxiliary circuit has an asymmetric response to the radiation, and is implemented to convey an indication of the radiation to a signal receiver regardless of the radiation on the auxiliary circuit.

The method preferably includes coupling one or more auxiliary circuits to at least one of the detectors, the auxiliary circuits having an asymmetric response to the radiation. The one or more auxiliary circuits preferably include a biased-low auxiliary circuit configured to output a logic low level in response to the radiation and a biased-high auxiliary circuit configured to output a logic high level in response to the radiation, and the biased-low auxiliary circuit and the biased-high auxiliary circuit are connected in series.

Preferably, the plurality of detectors includes a memory consisting of at least one of a biased-low detector which is operative to generate a logic low level in response to the radiation and a biased-high detector which is operative to generate a logic high level in response to the radiation. Further preferably, the memory consists of the biased-low detector and the biased-high detector coupled in series.

There is further provided, according to a preferred embodiment of the present invention, a method for protection of an integrated circuit, which includes operational-circuits formed on a semiconductor chip, the operational-circuits including components having predefined attributes, the method including:

modifying at least one of the attributes of one or more of the components so as to alter a response of the one or more of the components to radiation; and coupling the one or more of the components to the operational circuits to serve as a detector, so as to trigger a security measure in response to radiation incident on the chip in order to prevent tampering with the integrated circuit.

The components preferably include transistors, and the response of the one or more of the components includes an altered conductance of the transistors.

Alternatively or additionally, the response of the one or more of the components includes a change in an operational level of the operational-circuits; further alternatively or additionally, the response of the one or more of the components includes a change in a signal timing of the operational-circuits.

The method preferably includes choosing the at least one of the predefined attributes from at least one of layout attributes, layout dimensions, manufacturing-process attributes, doping dosage, adding a sub-element of the component, removing the sub-element of the component, and materials type.

Preferably, at least one of the operational-circuits functions according to predefined specifications while the radiation is not incident thereon, and functions differently from the predefined specifications while the radiation is incident thereon.

There is further provided, according to a preferred embodiment of the present invention, a method for protecting an integrated circuit, which includes operational-circuits formed on a chip, the method including:

providing circuitry, consisting of a plurality of detectors, integrally formed on the chip as part of the integrated circuit and dispersed among the operational-circuits on the chip, the detectors being adapted, in response to radiation incident on the chip, to trigger a security measure so as to prevent tampering with the integrated circuit; and activating the security measure.

Preferably, the radiation includes detector-triggering radiation which generates the security measure, wherein a level of the detector-triggering radiation is less than the level of radiation that affects a functionality of the operational-circuits while being sufficient to trigger the detectors.

The method preferably includes modifying at least one of the operational-circuits to form at least one of the detectors, so that a response of the at least one of the detectors to the radiation is different from a response of the operational-circuits to the radiation.

Preferably, the plurality of detectors are chosen from at least one biased-low detector which is operative to generate a logic low level in response to the radiation and at least one biased-high detector which is operative to generate a logic high level in response to the radiation.

There is further provided, according to a preferred embodiment of the present invention, an integrated circuit formed on a chip, including:

operational circuits consisting of components having predefined attributes, wherein the attributes of a plurality of the components are modified so as to alter a response of the plurality of the components to radiation incident on the chip so as to prevent tampering with the integrated circuit.

There is further provided, according to a preferred embodiment of the present invention, a method for protection of an integrated circuit formed on a chip, the integrated circuit including operational-circuits including components having predefined attributes, the method including:

modifying the attributes of a plurality of the components so as to alter a response of the plurality of the components to radiation incident on the chip so as to prevent tampering with the integrated circuit.

The present invention will be more fully understood from the following detailed description of the preferred embodiments thereof, taken together with the drawings, a brief description of which follows.

DETAILED DESCRIPTION OF PREFERRED EMBODIMENTS

Figure 1:
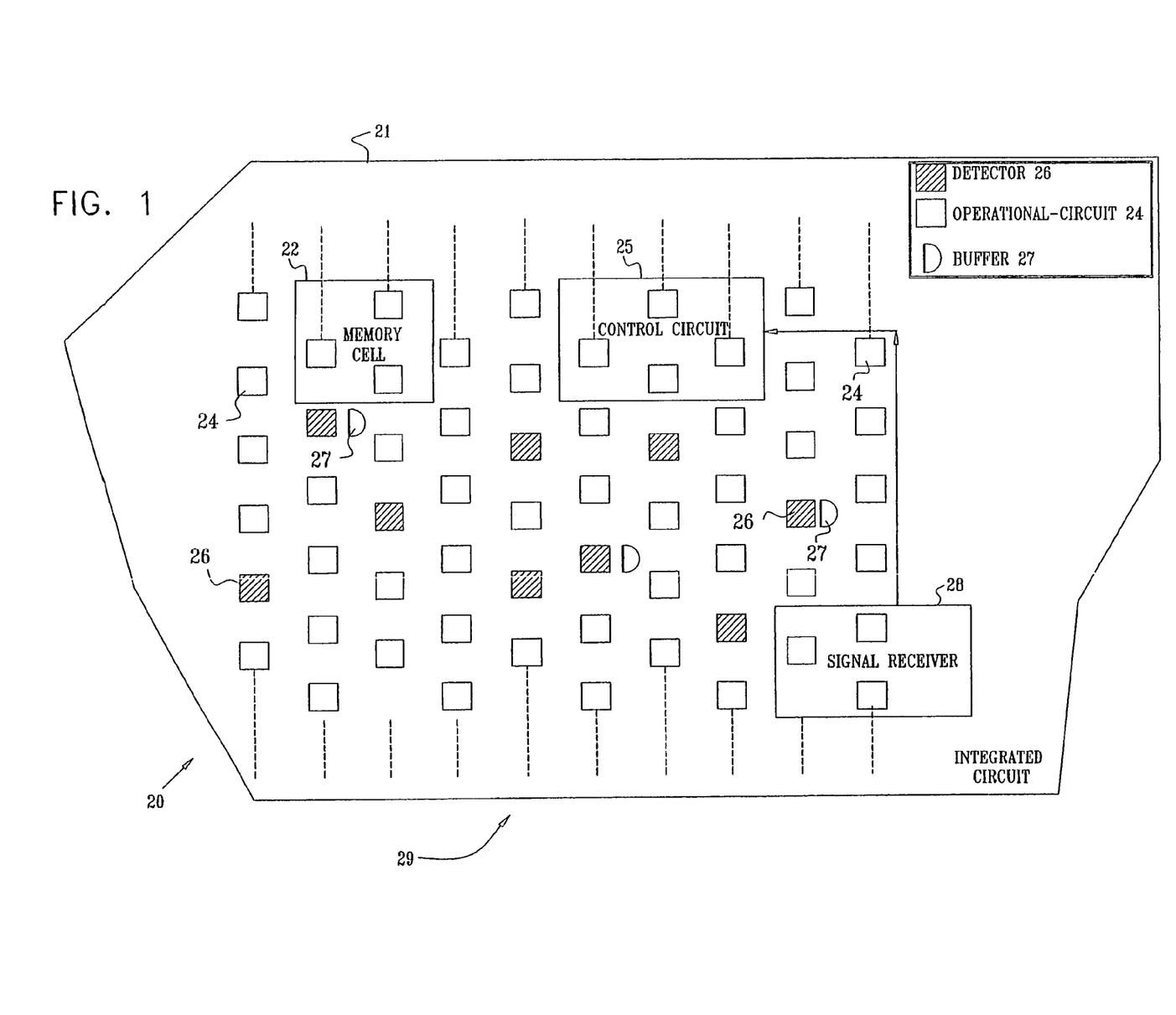
FIG. 1 is a schematic diagram of a section of an integrated circuit, according to a preferred embodiment of the present invention.

Reference is now made to FIG. 1, which is a schematic diagram of a section of an integrated circuit (IC) 20, according to a preferred embodiment of the present invention. IC 20 comprises operational-circuits 24 of the IC, formed on a semiconductor chip 21. The operational-circuits are circuits that comprise active components, such as transistors, and passive components, such as resistors or capacitors. As is known in the art, components have predefined attributes. These attributes may include layout attributes (any attributes which may be controlled during the design phase via the layout) such as dimensions, capacitance and so forth, and manufacturing-process attributes such as doping dosage, materials type, etc.

The operational-circuits are coupled together by conducting lines (for clarity, these are not shown in FIG. 1) so as to produce the IC. Typically, operational-circuits 24 and their coupling lines are formed by processes including selective doping, photolithography, and chemical etching, or by one or more other processes known in the art for producing integrated circuits.

Also formed integrally in IC 20 are small radiation detectors 26, which are dispersed among circuits 24. Detectors 26 comprise components which have substantially similar dimensions as the components of the operational-circuits. Each detector is implemented, most preferably using the same technology as that of circuits 24, to output a trigger signal when radiation, herein termed triggering radiation, is incident on the detector. The functionality of operational-circuits 24 may be changed by radiation at (and above) a specific level, herein termed the "functionality-changing" level. Such radiation may insert a fault into one or more of circuits 24. Triggering radiation comprises radiation having a level greater than or equal to a trigger-level below the functionality-changing level, sufficient to activate detectors 26. The trigger signal thus acts as an indication that IC 20 is being attacked by the triggering radiation. Such triggering radiation comprises any radiation that irradiates a relatively large area compared to the size of a single component of IC 20. Typically, such an area may have dimensions in a range from tens of microns to hundreds of microns or more. Hereinbelow, by way of example, the triggering radiation is assumed to be optical radiation unless otherwise stated.

In some preferred embodiment of the present invention, a lower (or optionally the upper as well) surface 29 of IC 20 is roughened. The roughening defocuses any very narrow beam that an attacker may irradiate through the lower surface (or optionally the upper as well), so that one or more detectors 26 receive the attacking radiation, even if it is not initially aimed at any of the detectors.

Detector 26 may be connected to one or more auxiliary circuits such as inverters, buffers 27, self-test circuitry, reset circuitry, receiver 28, control circuit 25, etc. It will be understood that the output of detector 26 may be fed directly to operational circuitry, or to one or more control circuits, or to one or more signal receivers 28 implemented in IC 20. Receiver 28 may act as a concentration point for signals from one or more detectors 26, and is implemented so that any trigger signal entering the receiver from the detectors generates an indication that an optical radiation attack on IC 20 is occurring. As is known in the art, buffers 27 may be introduced between the detectors and circuits they are connected to. As described in more detail below, auxiliary circuits such as buffers 27 are preferably configured as a third type of circuit, herein termed asymmetric-circuits, which have an asymmetric response to optical radiation, so that the asymmetric-circuits may be used to prevent neutralization of the trigger signal from the detectors. As is also described in more detail below, at least some buffers 27 may also be implemented to act as radiation detectors.

The indication may be used to notify a control circuit 25 of the attack, so that the control circuit is able to institute security measures (or any other measure) that circumvent the attack. Preferably, control circuit 25 comprises a sub-group of circuits 24 within IC 20 that inhibit the attack, for example by causing a clock circuit constructed from circuits 24 to stop. The control circuit may also comprise one or more asymmetric-circuits to further prevent radiation from neutralizing the control circuit.

In some preferred embodiments of the present invention, IC 20 comprises one or more radiation detecting memory cells 22, which preferably provide the indication of attack to receiver 28, or alternatively to control circuit 25, or any other circuit. Radiation detecting memory cell 22 is described in more detail below with reference to FIG. 12.

Figure 2:
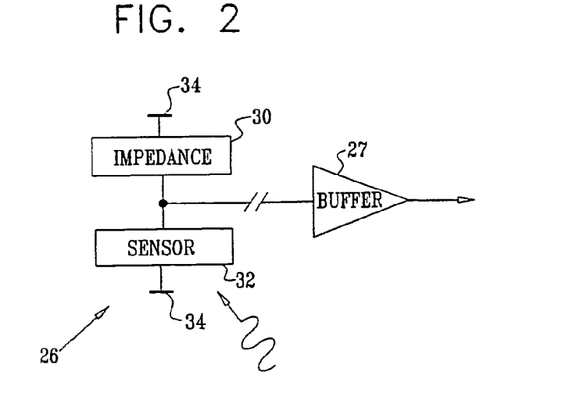
FIG. 2 is a schematic block diagram of a radiation detector and a buffer, according to a preferred embodiment of the present invention.

FIG. 2 is a schematic block diagram of detector 26 (and a buffer 27), according to a preferred embodiment of the present invention. Detector 26 comprises a sensor 32, which is implemented to be sensitive to triggering radiation as described above. Sensor 32 is connected in series with an impedance 30, and the series combination of impedance 30 and sensor 32 are coupled between two power supply rails 34. During operation of IC 20 there is a potential difference between rails 34. Sensor 32 is designed so that a property of the sensor changes when triggering radiation is incident on the sensor. Typically, sensor 32 comprises a semiconductor, and the property comprises the semiconductor impedance which decreases when the triggering radiation is incident on the sensor. In this case, the triggering signal from detector 26 comprises a voltage change generated at the junction of impedance 30 and sensor 32. The triggering signal may be transferred to receiver 28 via one or more buffers 27. Some possible methods for forming impedance 30 and sensor 32 are described hereinbelow.

Figure 3:
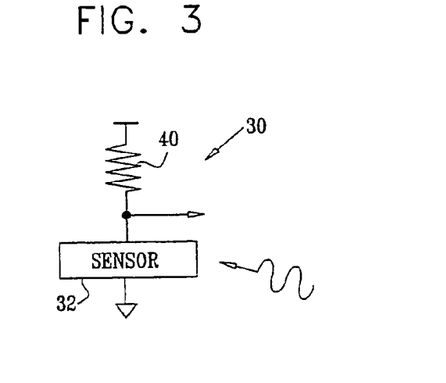
FIG. 3 is a schematic diagram illustrating an implementation of an impedance of the radiation detector of FIG. 2, according to a preferred embodiment of the present invention.
Figure 4:
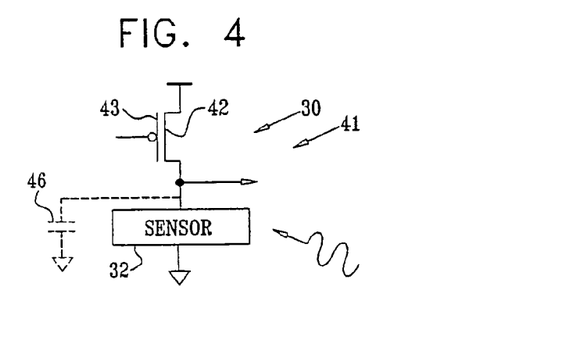
FIG. 4 is a schematic diagram illustrating an alternative implementation of the impedance of the radiation detector of FIG. 2, according to a preferred embodiment of the present invention.
Figure 5:
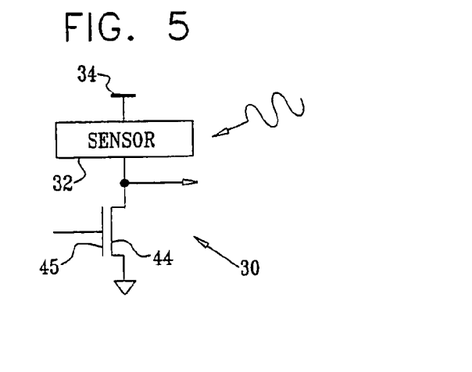
FIG. 5 is a schematic diagram illustrating another alternative implementation of the impedance of the radiation detector of FIG. 2, according to a preferred embodiment of the present invention.

FIGS. 3, 4 and 5 are schematic diagrams illustrating implementations of impedance 30 of detector 26, according to preferred embodiments of the present invention. FIG. 3 illustrates a resistor 40 being used as impedance 30. FIG. 4 illustrates a circuit 41 having a p-channel CMOS FET 42, preferably with its gate 43 connected to ground so that transistor 42 is conducting, as impedance 30. Alternatively, gate 43 receives a periodic signal, and a capacitor 46 (shown by broken lines in FIG. 4) represents the parasitic capacitance parallel with sensor 32, so that transistor 42 periodically charges capacitor 46 to maintain the voltage level across the capacitor, in a similar manner to that used to periodically refresh a memory element such as a dynamic random access memory (DRAM). (Thus, the optical radiation is needed to only discharge the small capacitor rather than maintaining the current through the impedance.) FIG. 5 illustrates an n-channel MOS-FET 44, preferably with its gate 45 connected to one of rails 34 set as a positive rail, as impedance 30. Other methods for forming impedance 30, such as by implementing it from a bipolar transistor, will be familiar to those skilled in the art. All such methods are assumed to be comprised within the scope of the present invention.

Figure 6:
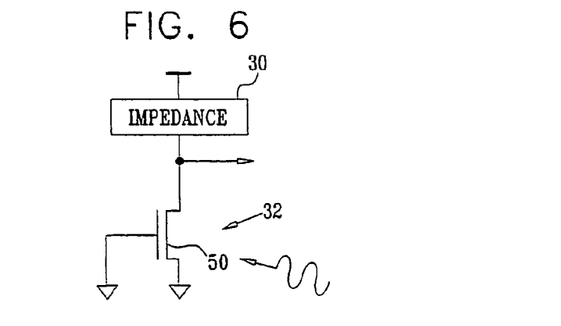
FIG. 6 is a schematic diagram illustrating an implementation of a sensor of the detector of FIG. 2, according to a preferred embodiment of the present invention.
Figure 7:
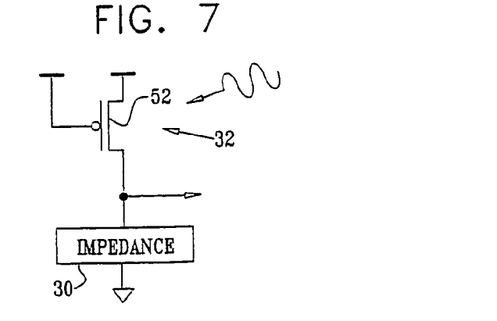
FIG. 7 is a schematic diagram illustrating an alternative implementation of the sensor of the detector of FIG. 2, according to a preferred embodiment of the present invention.

FIGS. 6 and 7 are schematic diagrams illustrating implementations of sensor 32 of detector 26, according to preferred embodiments of the present invention. FIG. 6 illustrates an n-channel MOS-FET 50, with its gate connected to ground so that it is normally off, being used as sensor 32. As is described in more detail below, the circuit comprising transistor 50 and impedance 30 is preferably formed by applying one or more modifications to a "standard circuit." For example, these modifications may increase the conductance of transistor 50 as a result of irradiation, and/or increase the value for impedance 30, so as to lower the triggering intensity level of incident radiation that is needed to activate an alarm. FIG. 7 illustrates a p-channel MOS-FET 52, with its gate connected to the positive rail so that it is normally off, being used as sensor 32. The same above description of FIG. 6 applies here (except for the opposite polarity of the alarm signal).

Typically, some of the operational-circuits comprised in IC 20 may be modified to change their sensitivity to optical radiation. For example, a "standard" inverter that comprises a complementary P-N transistor pair, may change its sensitivity to radiation when the ratio of the conductivities between the two transistors is modified. These modifications are preferably made by changing layout attributes or manufacturing-process attributes of one or more of the circuit's components. It will be understood that layout attributes modification may include adding or removing sub-elements (e.g. removing a gate electrode, adding an opaque layer, etc).

Figures 8, 9:
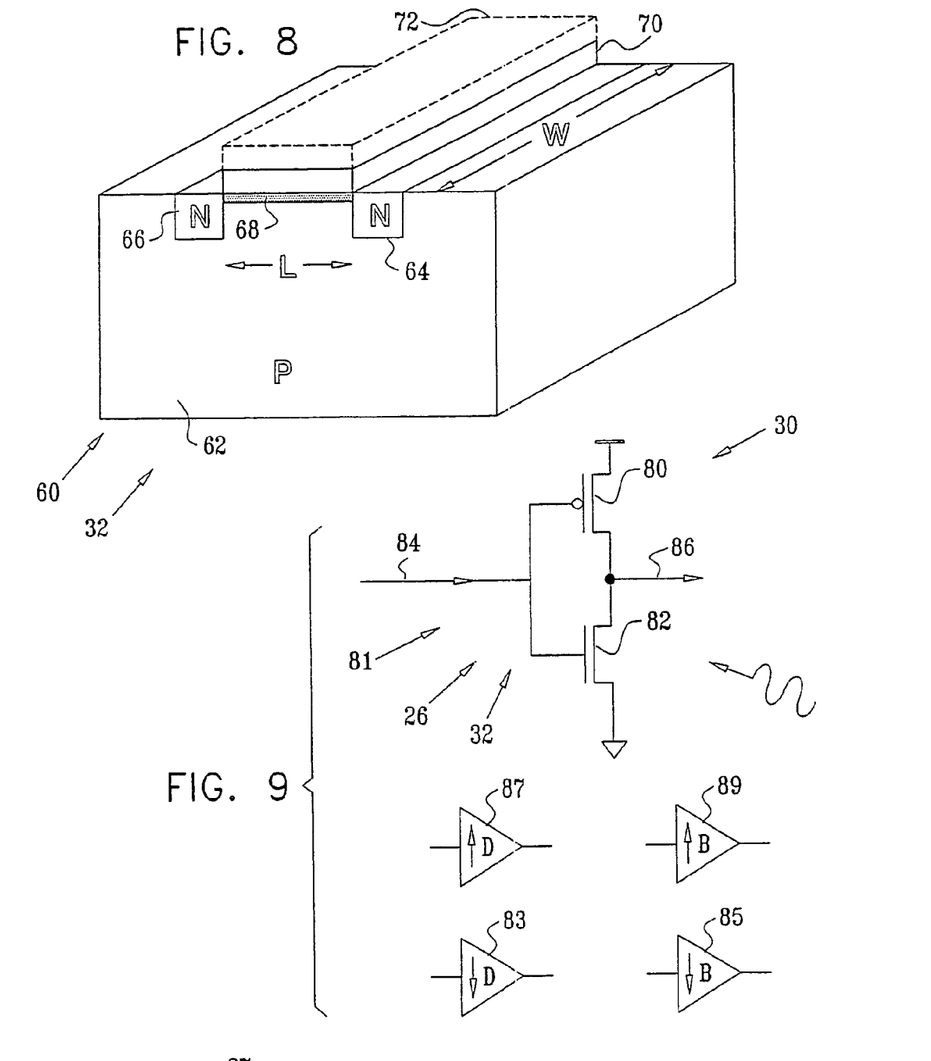
FIG. 8 is a perspective diagram illustrating modifications to a transistor forming the detector of FIG. 2, according to a preferred embodiment of the present invention.
FIG. 9 is a schematic diagram of an inverter, according to a preferred embodiment of the present invention.

FIG. 8 is a perspective diagram illustrating modifications to a transistor 60 so as to form sensor 32, according to a preferred embodiment of the present invention. By way of example, transistor 60 is assumed to be an n-channel transistor, but substantially similar modifications to those described herein may be applied to a p-channel transistor. Transistor 60 comprises a substrate 62 within which are formed an n-doped section 64 and an n-doped section 66, acting respectively as a source and a drain for the transistor, both sections having widths represented by "W," and being separated by a separation represented by "L."

For example, as is known in the art, dimensions L and/or W may be altered, e.g. by decreasing L and/or increasing W, so that the conductance of channel 68 changes. Alternatively or additionally, the doping applied to a channel 68 may be different from that of the channel of a typical operational transistor, so that when irradiated, the amount of generated electron-hole pairs that can pass through the channel is higher than that of a typical channel. Other alterations that change the response of transistor 60, or of other components of IC 20, to optical radiation, will be apparent to those skilled in the art. All such alterations are to be considered as comprised within the scope of the present invention.

One or more detectors 26, such as those illustrated by FIGS. 3-7 and/or having modifications as described with reference to FIG. 8, may also be used as components of operational-circuit 24 (FIG. 1), thus serving a dual function. When no radiation falls on the operational-circuit, it behaves according to predefined specifications. When triggering radiation falls on the operational-circuit, however, the detectors cause the circuit to behave differently from the predefined specifications.

The change in operation of the operational-circuit caused by the detector serves as a security measure for IC 20. For example, detector 26 may comprise a transistor within a gate array or other circuit, wherein the transistor functions normally as long as the circuit is not tampered with, but which responds to light differently from the other transistors. The detector may be coupled within the operational-circuit in such a way as to change the circuit output when irradiated, or to lock the circuit completely, or to trigger a warning signal. Other responses of the operational-circuit that may act as a security measure will be apparent to those skilled in the art. All such responses are considered to be within the scope of the present invention.

FIG. 9 is a schematic diagram of a typical CMOS inverter 81 forming an asymmetric response to light, where the increase of conductance of transistor 82 caused by irradiation is greater than that of transistor 80, according to a preferred embodiment of the present invention. Such a circuit may serve either as an "optically-biased low detector" or as an "optically-biased low inverter/buffer". In cases where the asymmetry is strong enough so that the output will be a definite logical 0 regardless of the input signal while irradiated above the triggering level, it is referred to herein as a biased low detector 83, having a symbol shown in FIG. 9. In other cases the asymmetry may only guarantee that when the input is logical 1, so that logical 0 is expected at the inverter's output, radiation will not be able to change the output signal to logical 1. Such a circuit will be used for example in buffers that propagate or handle alarm signals, where it is important to ensure that the radiation falling on the buffers will not circumvent the alarm signal, and is referred to herein as a biased low inverter/buffer 85, having a symbol shown in FIG. 9.

Table I and Table II show the Boolean truth tables of circuits 83 and 85 respectively.

TABLE I

"Biased low detecting inverter"

| | Logic Level Out | |
|---|---|---|
| Logic Level In | No Triggering Radiation | Triggering-level Radiation and above |
| 0 | 1 | 0 |
| 1 | 0 | 0 |

TABLE II

"Biased low inverter/inverting-buffer"

| | Logic Level Out | |
|---|---|---|
| Logic Level In | No Triggering Radiation | Triggering-level Radiation or above |
| 0 | 1 | Undetermined (Preferably 0) |
| 1 | 0 | 0 |

The same principle may be used to create "biased high" circuits. Circuit 87 and 89 represent a "biased-high detector" and a "biased high inverter/buffer" respectively.

Figure 10:
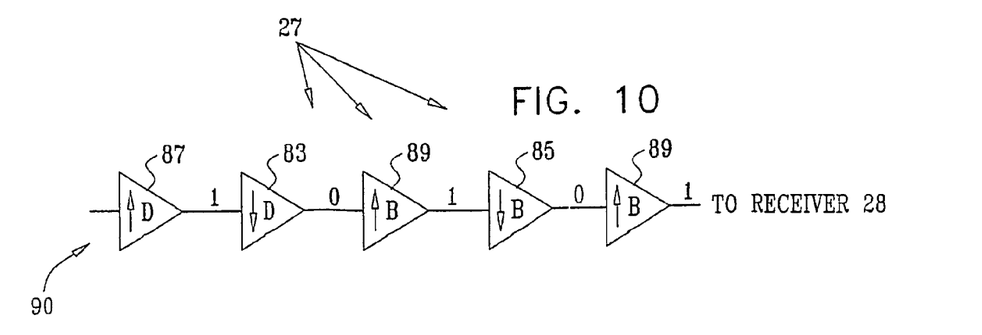
FIG. 10 is a schematic diagram of a chain of detectors and buffers, according to a preferred embodiment of the present invention.

FIG. 10 is a schematic diagram of a chain of detectors and buffers, according to a preferred embodiment of the present invention. A circuit 90 comprises a biased-high detector 87, a biased-low detector 83, two biased-high buffers 89, and one biased-low buffer 85. Circuit 90 is implemented when the alarm trigger signal—from the final buffer 89—informing receiver 28 of an attack is level '1.' The components of circuit 90 are connected serially in an alternating biased-high biased-low configuration, so that triggering radiation on at least one of detectors 87 or 83 generates a '0' on the output of detector 83 that is propagated as alternate '0s' and '1s' as shown in FIG. 10. Coupling the asymmetric buffers after detector 83 in the alternating manner shown ensures that regardless of triggering radiation falling on any of the buffers, the trigger signal from detector 87 or detector 83 is not neutralized, and generates a level '1' at receiver 28.

It will be appreciated that buffers 85 or 89 do not necessarily create an alarm signal when irradiated at triggering levels, but in cases where the radiation that falls on them is sufficiently high, they may practically act as detectors (i.e. give an alarm output regardless of their input).

It will be understood that configurations other than the series configurations of circuit 90 may be used to couple detectors to a signal receiver. Such configurations include, but are not limited to, multi-input/output detectors/buffers, in tree configurations and/or star configurations, where detectors are with buffers at any given order, or without buffers at all. All such configurations are assumed to be within the scope of the present invention.

Figures 11, 12:
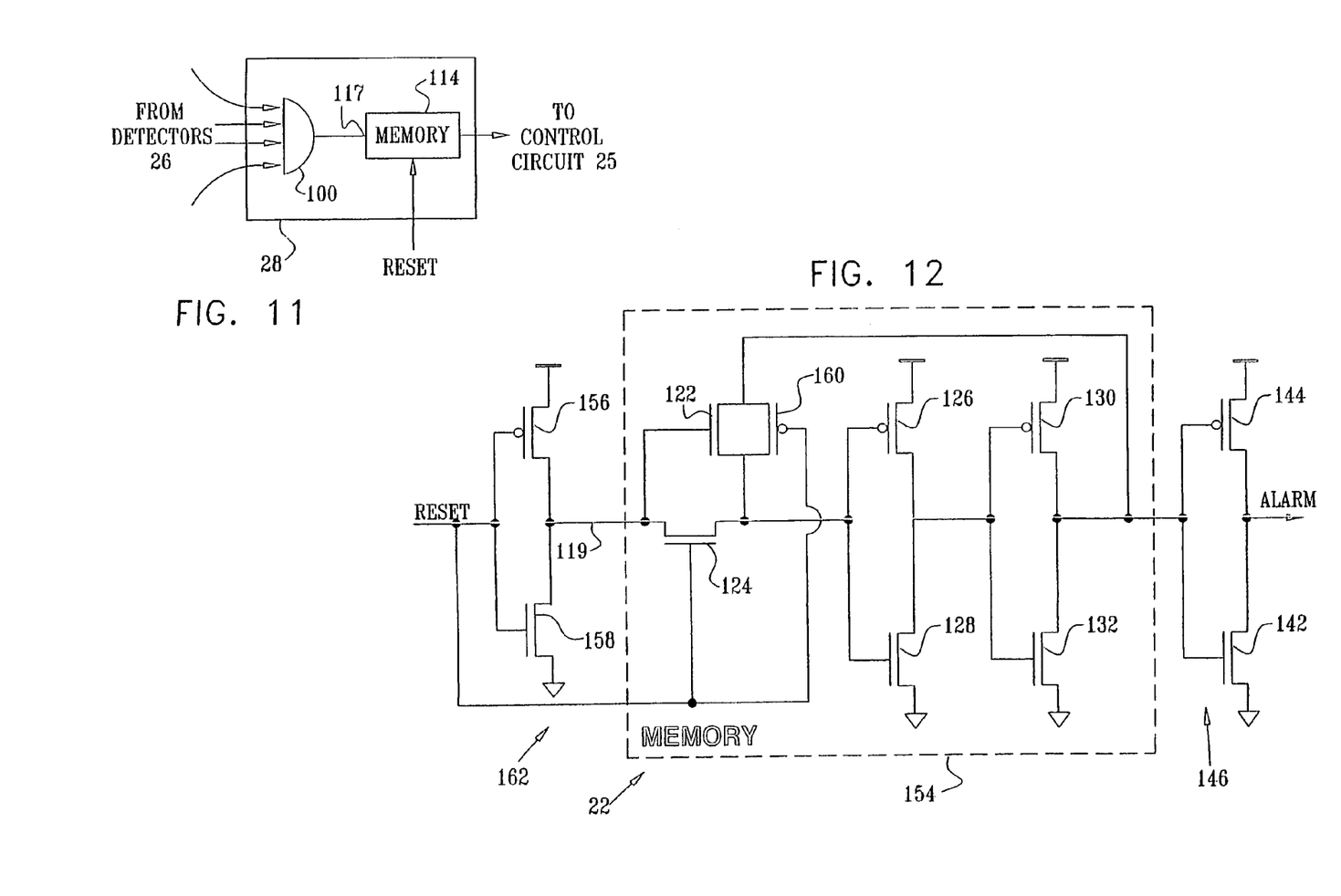
FIG. 11 is a schematic circuit diagram of a receiver, according to a preferred embodiment of the present invention.
FIG. 12 is a schematic circuit diagram of a radiation detecting memory cell, according to a preferred embodiment of the present invention.

FIG. 11 is a schematic circuit diagram of receiver 28, according to a preferred embodiment of the present invention. Receiver 28 comprises a gate 100, which has as its inputs coupling lines from buffers 27 and/or detectors 26 (FIG. 1). Gate 100 is implemented to act effectively as a logical OR gate, so that any trigger signal received at gate 100 causes the gate to output a pulse/level change to an input 117 of a memory 114, which in turn provides an output to control circuit 25. Memory 114 is preferably also configured to receive a reset signal, which resets the memory to be in an "on-guard" state, wherein the memory is waiting for the pulse/level change at input 117. In some preferred embodiments of the present invention, gate 100 and/or memory cell 114 are configured to respond to radiation, preferably according to the principles described above with reference to detectors 83 or 87, or buffers 85 or 89. Thus, when gate 100 and/or memory cell 114 are irradiated while receiving an alarm or after having received an alarm, the alarm is not neutralized, rather the alarm may be set.

It will be noted that the "logical or" function of gate 100 relates to "alarm=true" signal, where the logical level of "true" for each alarm signal line may be arbitrarily chosen by the designer to be 0 or 1.

FIG. 12 is a schematic circuit diagram of radiation detecting memory cell 22, according to a preferred embodiment of the present invention. A reset input buffer 162 most preferably comprises two transistors 156 and 158 configured as a biased-high buffer 89, so that the buffer will not cause a false reset action when irradiated. A memory 154 receives its reset signal from both the reset signal and buffer 162 and comprises a first biased-low pair of storage transistors—a p-channel transistor 126 and an n-channel transistor 128, most preferably configured as a biased-low detector 83. The first pair of transistors is coupled to a second biased-high pair of storage transistors—a p-channel transistor 130 and an n-channel transistor 132, most preferably configured as biased-high detector 87. Switching transistors 122, 160, and 124 couple the two pairs of storage transistors. A RESET pulse/level signal of value '1' ("-high") at the input to buffer 162 causes memory 154 to change its state to '0' at the output of memory-cell 154. The output of memory 154 may be supplied to buffer 146, which comprises two transistors 142 and 144, and which is preferably configured as a biased-low buffer 85. The output of buffer 146 is used as the indication of attack on IC 20 may be supplied to control circuit 25 or receiver 28.

It will be appreciated that triggering radiation incident on any of the biased storage transistor pairs of the memory 154, regardless of radiation falling on buffer 162, and/or on transistors 122, 124. 160 and/or buffer 146, will set the output of buffer 146 to indicate an attack on IC 20.

Those skilled in the art will appreciate that certain parts of the detecting memory cell 22 may be separated from other parts of the cell, for example input buffer 162 may be remotely positioned from the rest of cell 22.

To summarize the effects that may be created by including detectors of the types described above in an IC, we note that when an attack on the IC results in a fault being inserted into an operational-circuit, the functional result may typically be one of three types:

A1) The functionality is affected in a manner that compromises security (e.g., changes a state that gains unauthorized permissions).

A2) The functionality is affected in a manner that increases security (e.g., if corrupted data or a changed state causes a "loss of permissions"—or a "reset").

A3) The functionality is not affected (e.g., a bit of data is flipped, but is then ignored or corrected).

We also note that while some circuits may always respond in the manner of type A2 (herein termed an "inherent A2"), others may respond sometimes in the manner of A2 and sometimes as A1 or A3, or may not respond. (For example, the response may depend on the inputs and state of the circuit at the instant of the attack, and/or on the radiation intensity).

For each instance of circuits of type A1 it is preferred to have in the neighborhood of the circuit a cell that will act either as a special dedicated detector, or as an "inherent A2" circuit. For example, if some memory cells act as "inherent A2", and other memory cells act as "sometimes or always A1", we may modify the "inherent A2" cells so that they become responsive to a triggering level lower than the level that may insert a fault into the "sometimes or always A1", and disperse them among the "sometimes or always A1" cells.

In some cases it is sufficient to modify a certain circuit to be "biased high/low", thus making it naturally immune to tampering by radiation. For example: if a register bit acts as a "protect bit" when set high, we may modify it to act as "biased high", thus protecting it from being forced low by radiation.

Although the embodiments described above are based primarily on CMOS technology, it will be appreciated that the principles of the present invention may be implemented in substantially any technology appropriate for forming integrated circuits, including, but not limited to, metal oxide semiconductor (MOS) technologies and bipolar technologies.

It will further be appreciated that the scope of the present invention comprises substantially any appropriate type of circuit or component thereof that may be implemented in an integrated circuit, including circuits operating at high/low levels, circuits operating at continuously-varying levels, and combinations of such circuits. Thus, modifications to such circuits or components thereof may generate on irradiation a changed operational high/low level, or a change in the operational continuously-varying level, compared to an unmodified circuit.

Furthermore, the attack mechanism may involve variations of the timing of signal transitions rather than just changing signal levels (e.g. when the attack results in sampling a signal before the signal transition was completed). A person skilled in the art will appreciate that it is possible to modify a circuit having such a variation in signal timing so that the circuit is sensitive to lower levels of radiation (e.g. by feeding the modified circuit with the same input signals at the same timing as an unmodified operational-circuit).

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Circuitry for protection of an integrated circuit, which integrated circuit includes operational-circuits formed on a chip, the circuitry comprising:

a plurality of detectors, integrally formed on the chip as part of the integrated circuit and dispersed among the operational-circuits on the chip, the detectors being adapted, in response to radiation incident on the chip, to trigger a security measure so as to prevent tampering with the integrated circuit, wherein the operational-circuits include components having predefined attributes, and wherein the detectors are formed by modifying at least one of the attributes of one or more of the components so as to alter the response of the detectors to the radiation relative to the response of the components having the predefined attributes, and wherein the predefined attributes are chosen from at least one of layout attributes, layout dimensions, manufacturing-process attributes, doping dosage, adding a sub-element of the component, removing the sub-element of the component, and materials type.

2. The circuitry according to claim 1, wherein at least one of the detectors comprises a p-channel transistor coupled in series with an n-channel transistor, and wherein in response to the radiation a conductance of the p-channel transistor is substantially different from the conductance of the n-channel transistor.

3. The circuitry according to claim 1, wherein at least one of the detectors comprises a memory, and wherein the security measure comprises a change of state of the memory.

4. The, circuitry according to claim 1, wherein the integrated circuit is implemented according to a technology chosen from at least one of metal oxide semiconductor and bipolar technologies.

5. The circuitry according to claim 1, wherein the chip is a semiconductor chip.

6. The circuitry according to claim 1, wherein the radiation comprises at least one type of radiation chosen from electromagnetic radiation and ionizing radiation.

7. The circuitry according to claim 1, wherein the plurality of detectors are chosen from at least one biased-low detector which is operative to generate a logic low level in response to the radiation and at least one biased-high detector which is operative to generate a logic high level in response to the radiation.

8. The circuitry according to claim 1, and comprising a roughened chip surface that defocuses the radiation.

9. The circuitry according to claim 1, wherein the tampering comprises a fault being inserted into one of the operational-circuits so as to cause a functional result in the integrated circuit.

10. The circuitry according to claim 1, wherein at least one of the detectors is coupled to serve as one of the components in one of the operational-circuits.

11. The circuitry according to claim 10, wherein the one of the operational-circuits functions according to predefined specifications while the radiation is not incident thereon.

12. The circuitry according to claim 11, wherein the one of the operational-circuits functions differently from the predefined specifications while the radiation is incident thereon.

13. The circuitry according to claim 1, wherein the components comprise transistors, and wherein the response of the detectors comprises an altered conductance of the transistors.

14. The circuitry according to claim 1, wherein the response of the detectors comprises a change in an operational level of the operational-circuits.

15. The circuitry according to claim 1, wherein the response of the detectors comprises a change in a signal timing of the operational-circuits.

16. The circuitry according to claim 1, wherein the radiation comprises detector-triggering radiation, and wherein a level of the detector-triggering radiation is less than the level of radiation that affects a functionality of the operational-circuits while being sufficient to trigger the detectors.

17. The circuitry according to claim 16, wherein the radiation comprises optical radiation.

18. The circuitry according to claim 1, and comprising an auxiliary circuit which is coupled to at least one of the plurality of detectors and which is implemented to receive a trigger signal from the at least one of the detectors.

19. The circuitry according to claim 18, wherein the trigger signal is received as the security measure and wherein the auxiliary circuit is implemented to generate a control signal in response thereto, and comprising a control circuit which is coupled to receive the control signal so as to initiate an alarm in response thereto.

20. The circuitry according to claim 18, wherein the auxiliary circuit comprises elements selected from the operational-circuits and the detectors so as to provide an indication of the radiation in response to the radiation being incident on at least a part of the auxiliary circuit.

21. The circuitry according to claim 18, wherein the auxiliary circuit comprises a memory, and wherein the indication comprises a change of state of the memory.

22. The circuitry according to claim 18, wherein the auxiliary circuit has an asymmetric response to the radiation, and is implemented to convey an indication of the radiation to a signal receiver regardless of the radiation on the auxiliary circuit.

23. The circuitry according to claim 1, and comprising one or more auxiliary circuits coupled to at least one of the detectors and having an asymmetric response to the radiation.

24. The circuitry according to claim 23, wherein the one or more auxiliary circuits comprise a biased-low auxiliary circuit configured to output a logic low level in response to the radiation and a biased-high auxiliary circuit configured to output a logic high level in response to the radiation, and wherein the biased-low auxiliary circuit and the biased-high auxiliary circuit are connected in series.

25. The circuitry according to claim 1, wherein the plurality of detectors comprises a memory comprising at least one of a biased-low detector which is operative to generate a logic low level in response to the radiation and a biased-high detector which is operative to generate a logic high level in response to the radiation.

26. The circuitry according to claim 25, wherein the biased-low detector and the biased-high detector are coupled in series.

27. A method for protection of an integrated circuit, which integrated circuit includes operational-circuits formed on a chip, the method comprising:
  integrally forming a plurality of detectors on the chip as part of the integrated circuit, so that the detectors are dispersed among the operational-circuits on the chip, the detectors being adapted, in response to radiation incident on the chip, to trigger a security measure so as to prevent tampering with the integrated circuit, and also forming an auxiliary circuit which is coupled to at least one of the plurality of detectors,
  wherein at least one of the following has an enhanced asymmetric response to the radiation: at least one of the plurality of detectors; and the auxiliary circuit.

28. Circuitry for protection of an integrated circuit, which integrated circuit includes operational-circuits formed on a chip, the circuitry comprising:
  a plurality of detectors, integrally formed on the chip as part of the integrated circuit and dispersed among the operational-circuits on the chip, the detectors being adapted, in response to radiation incident on the chip, to trigger a security measure so as to prevent tampering with the integrated circuit, the chip comprising a roughened chip surface that defocuses the radiation.

29. The circuitry according to claim 28 and wherein the roughened chip surface comprises a lower surface.

30. The circuitry according to claim 28 and wherein the roughened chip surface comprises an upper surface.

31. A method for protection of an integrated circuit, which integrated circuit includes operational-circuits formed on a chip, the method comprising:

integrally forming a plurality of detectors on the chip as part of the integrated circuit, so that the detectors are dispersed among the operational-circuits on the chip, the detectors being adapted, in response to radiation incident on the chip, to trigger a security measure so as to prevent tampering with the integrated circuit; and roughening a surface of the chip so as to defocus radiation incident on the roughened surface.

32. Circuitry for protection of an integrated circuit, which integrated circuit includes operational-circuits formed on a chip, the circuitry comprising:

a plurality of protective circuits, integrally formed on the chip as part of the integrated circuit and dispersed among the operational-circuits on the chip, the protective circuits being adapted, in response to radiation incident on the chip, to apply a security measure so as to prevent tampering with the integrated circuit, wherein the operational-circuits include components having predefined attributes, and wherein the protective circuits have at least one modified attribute, relative to at least one predefined attribute of at least one of the components, so as to alter the response of the protective circuits to the radiation relative to the response of the components having the predefined attributes, and wherein the chip has an upper surface and a lower surface, and at least one of the upper surface and the lower surface is roughened so as to defocus radiation incident on the roughened surface.

33. The circuitry according to claim 32 and wherein at least one of the plurality of protective circuits comprises a radiation detector.

34. The circuitry according to claim 33 and wherein at least one of the plurality of protective circuits comprises an auxiliary circuit coupled with the radiation detector.

35. The circuitry according to claim 32 and wherein at least one of the protective circuits serves as one of the components in one of the operational-circuits.

36. The circuitry according to claim 32 and wherein the predefined attributes are chosen from at least one of: layout attributes; layout dimensions; manufacturing-process attributes; doping dosage; adding a sub-element of the component; removing the sub-element of the component; and materials type.

37. A method for protection of an integrated circuit, which integrated circuit includes operational-circuits formed on a chip, the method comprising:

integrally forming a plurality of protective circuits on the chip as part of the integrated circuit, so that the protective circuits are dispersed among the operational-circuits on the chip, the protective circuits being adapted, in response to radiation incident on the chip, to apply a security measure so as to prevent tampering with the integrated circuit, wherein the operational-circuits include components having predefined attributes, and wherein the protective circuits have at least one modified attribute, relative to at least one predefined attribute of at least one of the components, so as to alter the response of the protective circuits to the radiation relative to the response of the components having the predefined attributes, and wherein the chip has an upper surface and a lower surface, and the method also comprises roughening at least one of the upper surface and the lower surface so as to defocus radiation incident on the roughened surface.

38. The method according to claim 37 and wherein at least one of the plurality of protective circuits comprises a radiation detector.

39. The method according to claim 38 and wherein at least one of the plurality of protective circuits comprises an auxiliary circuit coupled with the radiation detector.

40. The method according to claim 37 and wherein at least one of the protective circuits serves as one of the components in one of the operational-circuits.

41. The method according to claim 37 and wherein the predefined attributes are chosen from at least one of: layout attributes; layout dimensions; manufacturing-process attributes; doping dosage; adding a sub-element of the component; removing the sub-element of the component; and materials type.

* * * * *